(12) United States Patent
Zhao

(10) Patent No.: US 10,630,548 B2
(45) Date of Patent: Apr. 21, 2020

(54) UPDATE FILE DOWNLOAD METHOD, DEVICE, AND SYSTEM

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/533,033

(22) PCT Filed: Jan. 20, 2017

(86) PCT No.: PCT/CN2017/071908
§ 371 (c)(1),
(2) Date: Jun. 4, 2017

(87) PCT Pub. No.: WO2017/133491
PCT Pub. Date: Aug. 10, 2017

(65) Prior Publication Data
US 2018/0331891 A1    Nov. 15, 2018

(30) Foreign Application Priority Data

Feb. 4, 2016   (CN) .......................... 2016 1 0080750
Apr. 1, 2016   (CN) .......................... 2016 1 0204745

(51) Int. Cl.
*H04L 12/24*   (2006.01)
*H04L 29/08*   (2006.01)

(52) U.S. Cl.
CPC ........ *H04L 41/082* (2013.01); *H04L 41/0846* (2013.01); *H04L 67/06* (2013.01); *H04L 67/34* (2013.01); *H04L 41/0893* (2013.01)

(58) Field of Classification Search
None
See application file for complete search history.

(56) References Cited

U.S. PATENT DOCUMENTS

2009/0063650 A1* 3/2009 Anslow ................. H04L 41/082
                                                  709/208
2009/0300133 A1* 12/2009 Basson .............. G05B 19/0421
                                                  709/209

FOREIGN PATENT DOCUMENTS

CN      104902424 A      9/2015
CN      105049502 A      11/2015

OTHER PUBLICATIONS

International Search Report and Written Opinion dated Mar. 30, 2017 in PCT/CN2017/071908.
1st Office Action dated Dec. 11, 2019 in CN201610204745.9.

* cited by examiner

Primary Examiner — Jeffrey R Swearingen
(74) Attorney, Agent, or Firm — Syncoda LLC; Feng Ma

(57) ABSTRACT

The present disclosure provides an update file download method, device, and system. The method comprises obtaining configuration information of each terminal; determining a device group to which each terminal belongs and classification of master or slave device of each terminal in each device group based on a device grouping strategy, a classification strategy of master and slave devices, and the configuration information; and sending information of a master device to a slave device in a same device group, wherein the information of the master device is used for the slave device to download the at least one update file. The method can further include: the master device receiving the at least one update file from a server; and the slave device downloading the at least one update file from the master device.

19 Claims, 6 Drawing Sheets

UPDATE FILE DOWNLOAD METHOD, DEVICE, AND SYSTEM

CROSS-REFERENCE TO RELATED APPLICATIONS

The present application claims priorities to Chinese Patent Application Nos. CN 201610080750.3, filed on Feb. 4, 2016, and CN 201610204745.9 filed on Apr. 1, 2016; the disclosures of which are hereby incorporated by reference in their entirety.

TECHNICAL FIELD

The present disclosure relates generally to the field of communication technologies, and more specifically to an update file download method, device, and system.

BACKGROUND

With the development of internet communication technologies, an increasing number of terminal devices (e.g., "terminals") become available to customers. Such terminals may include, for example, home gateways, set-top boxes, or other devices.

The number of terminals increases rapidly together with the development of Internet of Things technologies. When a large number of terminals need updates, the update files need to be downloaded first for each terminal.

A method currently employed for downloading the update files is illustrated in FIG. 1, where a server sends a download request (Download) to each terminal that is connected with the server. After receiving the download request, each terminal downloads the file from the server, and then informs the server that the download is successful.

The aforementioned update file download method can have one or more of the following problems: 1. The server may be overloaded by the excessive update requests as each terminal sends the update requests to the same server. 2. When the large number of update files are transmitted from the server to each terminal, problems such as network jamming may occur due to the insufficient bandwidths of the terminals.

SUMMARY

In view of the above, embodiments of the present disclosure provide an update file download method, device and system to solve the problems of server overload and network jamming caused by existing batch update methods.

In a first aspect, a method of downloading at least one update file for at least one terminal is disclosed herein.

The method comprises the following steps:

obtaining configuration information of each terminal;

determining a device group to which each terminal belongs and classification of master or slave device of each terminal in each device group based on a device grouping strategy, a classification strategy of master and slave devices, and the configuration information; and sending information of a master device to a slave device in a same device group, wherein the information of the master device is used for the slave device to download the at least one update file.

According to some embodiments of the present disclosure, the method further comprises:

the master device receiving the at least one update file from a server; and the slave device downloading the at least one update file from the master device.

In the method as described above, the determining can comprise:

determining the device group to which each terminal belongs based on at least one of the device grouping strategy, or the configuration information of each terminal; and determining the classification of master or slave device based on at least one of the classification strategy of master and slave devices, or the configuration information of each terminal.

In the method as described above, the determining the device group to which the terminal belongs can comprise: determining the device group according to at least one of: the device grouping strategy, a manufacturer of the terminal, a hardware version, a software version, or a location information.

In the method as described above, the determining the classification of master or slave device can comprise: determining the classification according to at least one of: the classification strategy of master and slave devices, a manufacturer of the terminal, a hardware version, a software version, location information, an average CPU usage rate, a cache size, a network bandwidth, or a file server.

In the method as described above, the determining the device group to which the terminal belongs can comprise: determining the device group according to at least one of: the device grouping strategy, a terminal manufacturer, a hardware version, a software version, or location information; and the determining the classification of master or slave device can comprise: determining the classification of master and slave device in each device group according to at least one of the classification strategy of master and slave devices, a device manufacturer, a hardware version, a software version, location information, an average CPU usage rate, a cache size, a network bandwidth, or a file server.

According to some embodiments of the present disclosure, after the determining the device group and the determining the classification of master or slave device, the method can further include: sending information for the master device to download the at least one update file to the master device in each device group.

In the method as described above, the information for the master device to download the at least one update file comprises a server address; and the information of the master device used for the slave device to download the at least one update file comprises a master device address.

In the method as described above, the sending information of a master device to a slave device in a same device group can include at least one of: sending download requests that carry the master device address to the slave device, or sending set parameter values requests that carry the master device address to the slave device.

According to some embodiments of the present disclosure, prior to the sending information of a master device to a slave device in a same device group the method can further include: sending the configuration information of each terminal to a server, so that the server can determine the classification of master or slave device based on the configuration information.

In the method, the information of the master device can comprise an address of the master device, and the method can further include at least one of: receiving from the server download requests that carry the address, or receiving from the server set parameter values requests that carry the address.

The method as described above can further include at least one of the following:

receiving an address of each of at least one master device, determining a response speed of each of the at least one master device, and downloading the at least one update file from one of the at least one master device having a fastest respond speed;

receiving an address of each of at least one master device, and downloading the at least one update file from one of the at least one master device having an address that is received earliest from the server;

receiving an address of each of at least one master device, and downloading the at least one update file from randomly selected master device; or receiving an address of a sole master device, and downloading the at least one update file from the sole master device.

According to some embodiments, prior to the slave device downloading the at least one update file from the master device, the method can further include: the master device in each device group determining starting a file server of the master device.

In the method, the obtaining configuration information of each terminal can comprise one of the following:

obtaining the configuration information from each terminal;

obtaining the configuration information of each terminal from the server; or obtaining the configuration information of each terminal from a second server.

In the method, the device grouping strategy and the classification strategy of master and slave device can comprise at least one of:

a first strategy set prior to the obtaining of configuration information of each terminal; or a second strategy determined based on the configuration information that is obtained.

In a second aspect, the present disclosure further provides a server. The server comprises an obtaining circuit, a determining circuit, and a transmitting circuit.

The obtaining circuit is configured to obtain configuration information of each of at least one terminal. The determining circuit is configured to determine a device group to which each terminal belongs, and to determine classification of master or slave device based on a device grouping strategy, a classification strategy of master and slave devices, and the configuration information of each terminal.

The transmitting circuit is configured to send information of a master device in each device group to one or more slave devices of a same device group, wherein the information of the master device is used by the one or more slave devices in the same device group to download update files.

In some embodiments of the server, the determining circuit is further configured to realize at least one of:

determining the device group to which each terminal belongs based on the device grouping strategy;

determining the device group to which each terminal belongs based on the device grouping strategy and the configuration information of each terminal;

determining the device group to which each terminal belongs based on at least one of: the device grouping strategy, a device manufacturer, a hardware version, a software version, or location information;

determining the classification of master or slave device based on the classification strategy of master and slave devices;

determining the classification of master or slave device based on the classification strategy of master and slave devices and the configuration information of each terminal; or determining the classification of master and slave device in each device group based on at least one of: the classification strategy of master and slave devices, a device manufacturer, a hardware version, a software version, location information, an average CPU usage rate, a cache size, a network bandwidth, or a file server.

In some embodiments of the server, the transmitting circuit is further configured to send information for the master device to download update files to each master device in each device group.

In some embodiments of the server, the transmitting circuit is further configured to send a server address to the master device in each device group, and to send an address of the master device in each device group to the one or more slave devices of the same device group.

In the server as described above, the transmitting circuit is configured to send download requests that carry the address of the master device in the each device group to the one or more slave devices of the same device group, or to send set parameter values requests that carry the address of the master device in the each device group to the one or more slave devices of the same device group.

In some embodiments of the server, the obtaining circuit is configured to obtain the configuration information from each terminal, to obtain the configuration information of each terminal locally from the server; or to obtain the configuration information of each terminal from a second server.

In some embodiments of the server, the device grouping strategy and the classification strategy of master and slave device can comprise at least one of a first strategy set prior to the obtaining of configuration information of each terminal, or a second strategy determined based on the configuration information that is obtained.

In a third aspect, the present disclosure further provides a terminal. The terminal comprises a receiving circuit and a downloading circuit. The receiving circuit is configured to receive information of a master device in a device group sent by a server. The downloading circuit, configured to download at least one update file from the master device based on the information of the master device.

In some embodiments of the terminal, the receiving circuit is configured to receive an address of the master device sent by the server.

The terminal can further include a second transmitting circuit, wherein the second transmitting circuit is configured to send configuration information of the terminal to the server, such that the server can determine classification of the terminal based on the configuration information of the terminal prior to receiving address of the master device sent by the server:

In some embodiments of the terminal, the receiving circuit is configured to realize at least one of: receiving download requests sent by the server carrying the address of the master device in a same device group; or receiving set parameter values requests sent by the server carrying an address of the master device in the same device group.

In the terminal as described above, the downloading circuit can be configured to:

determine, if receiving addresses of more than one master devices, a response speed of each of the more than one master devices, and to download the at least one update file from one of the more than one master devices having a fastest respond speed;

download, if receiving addresses of more than one master devices, the at least one update file from one of the more than one master devices having an address that is received earliest from the server;

download, if receiving addresses of more than one master devices, the at least one update file from a randomly selected master device; or download, if receiving an address of a sole master device, the at least one update file from the sole master device.

The terminal according to any of the embodiments as described above can be a customer premise equipment (CPE).

In a fourth aspect, the present disclosure further provides another terminal. The terminal includes a second receiving circuit and a third transmitting circuit. The second receiving circuit is configured to receive at least one update file sent by a server; and the third transmitting circuit is configured to send the at least one update file to one or more slave devices in a device group.

According to some embodiments of the present disclosure, the terminal can further comprise a second determining circuit, wherein the second determining circuit is configured to determine that a file server in the terminal starts before the third transmitting circuit send the at least one update file to the one or more slave devices in the device group.

In some embodiments of the terminal, the third transmitting circuit is configured to send configuration information of the terminal to the server such that the server can determine classification of the terminal based on the configuration information of the terminal prior to sending the at least one update file to the one or more slave devices in the device group.

The terminal as described above can be a customer premise equipment (CPE).

In a sixth aspect, the present disclosure further provides an update file download system.

The system comprises at least one terminal and a server. The server is configured to obtain configuration information of each terminal, to determine a device group to which each terminal belongs and classification of master or slave device in each device group based on a device grouping strategy, a classification strategy of master and slave devices, and the configuration information of each terminal, and to send information of a master device to one or more slave devices of a same device group.

Herein the master device is configured to download at least one update file from the server. The slave device in each device group is configured to download the at least one update file from the master device according to the information of the master devices received.

The slave device comprises a receiving circuit configured to receive the information of the master device belong sent by the server; and a downloading circuit configured to download the at least one update file from the master device based on the information of the master device.

Herein the master device comprises: a receiving circuit configured to receive the at least one update file sent by the server; and a transmitting circuit configured to provide the at least one update file to one or more slave devices in the same device group.

In some embodiments of the system, the receiving circuit of the slave device is configured to realize at least one of receiving download requests sent by the server carrying an address of the master device in the same device group; or receiving set parameter values requests sent by the server carrying an address of the master device in the same device group.

In some embodiments of the system, the transmitting circuit of the master device is configured to send configuration information of the master device to the server prior to the receiving circuit receiving the at least one update file sent by the server, so that the server can determine the classification of the master device based on the configuration information.

According to some embodiments of the system, the server is an auto-configuration server (ACS), and the at least one terminal comprises at least one customer premise equipment (CPE).

Other embodiments may become obvious in view of the above.

BRIEF DESCRIPTION OF THE DRAWINGS

To more clearly illustrate the embodiments of the disclosure, the following is a brief description of the drawings, which are for illustrative purpose only. For those of ordinary skills in the art, other drawings of other embodiments can become apparent based on these drawings.

DETAILED DESCRIPTION

Figure 1:
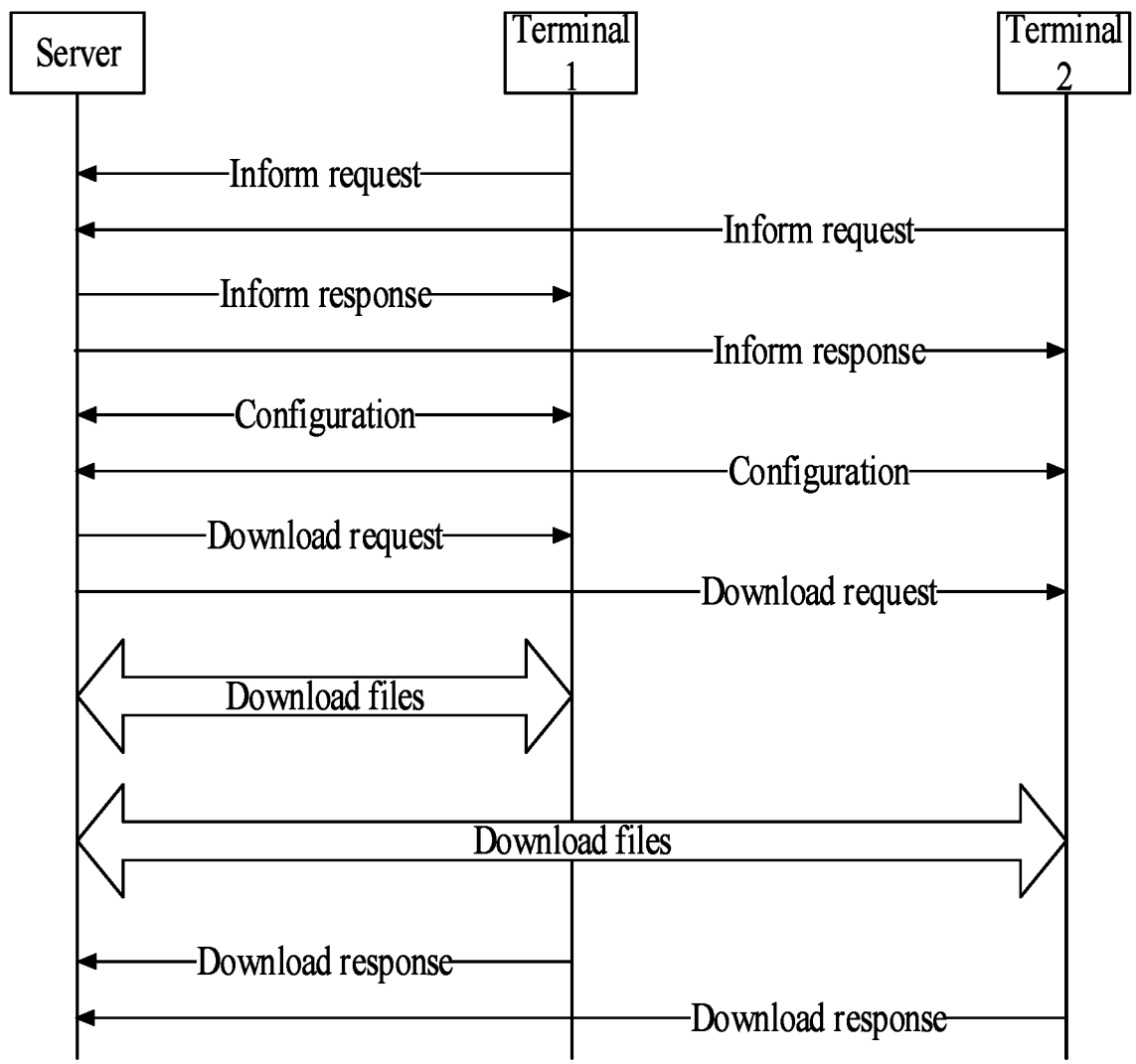
FIG. 1 is a schematic view of signaling interactions between a server and terminals in existing technologies.

In the following, with reference to the drawings of various embodiments disclosed herein, the technical solutions of the embodiments of the disclosure will be described in a clear and fully understandable way. It is obvious that the described embodiments are merely a portion but not all of the embodiments of the present disclosure. Based on the described embodiments of the disclosure, those ordinarily skilled in the art can obtain other embodiment(s), which come(s) within the scope sought for protection by the disclosure.

In the following descriptions, with respect to server(s), device(s), group(s), system(s), terminal(s), file(s), etc., in some occurrences singular forms are used, and in some other occurrences plural forms are used in the descriptions of various embodiments. It should be noted, however, the single or plural forms are not limiting but rather are for illustrative purposes. Unless it is expressly stated that a single server, device, group, system, terminal, or file etc. is employed, or it is expressly stated that a plurality of servers, devices, groups, systems, terminals, or files, etc. are employed, the server(s), device(s), group(s), system(s), terminal(s), file(s), etc. can be singular, or plural.

In an aspect, an update file download method is provided to solve problems such as excessive server load when a large number of devices are downloading update files from the server. In some embodiments, by setting terminal device groups, and master and slave devices, the method allows a master device to share the workload of the server, thereby reducing the server's load and improving the download efficiency.

In the following, an update file download method provided by embodiments of the present disclosure is described and illustrated in the drawings from both the server side and the device side (i.e. terminal side).

Figure 2:
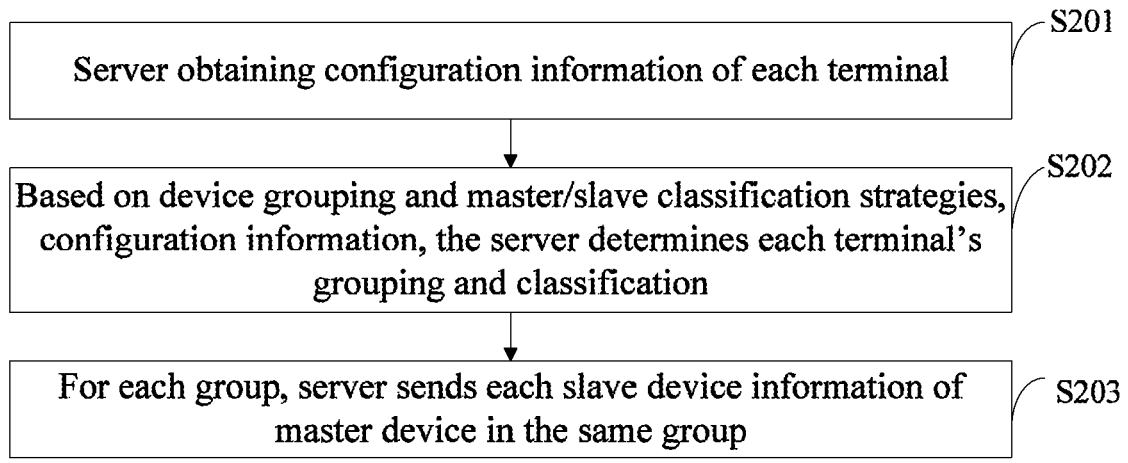
FIG. 2 is a flow chart illustrating an update file download method provided by embodiments of the present disclosure at a server side.

An update file download method from the server side as shown in FIG. 2 comprises:

S201. The server obtains the configuration information of each terminal.

Wherein, the terminal is the device that awaits to be updated, such as a set-top box, a home gateway, a router, or a mobile communication device.

When the server is obtaining configuration information, the ways to obtain the configuration information can include one or more of at least the following implementations.

(1) The server actively obtains the configuration information from each terminal.

(2) The terminal actively provides the configuration information to the server.

(3) The server obtains the configuration information of each terminal from a third party device.

(4) When the server is an auto-configuration server, it can provide configuration command to the terminal, or the auto-configuration server itself can store the configuration information of the terminal, and therefore the configuration information of the terminal can be obtained from the auto-configuration server locally, etc.

The configuration information can comprise: static configuration information that does not change frequently, such as the terminal manufacturer, the hardware version, and the software version, etc.

The configuration information can also comprise dynamic configuration information having content that can change frequently, such as the average CPU usage rate, the cache size, the network bandwidth, and the file server.

When obtaining the configuration information of each terminal, the server can obtain all types of configuration information of the terminal according to some embodiments. According to some other embodiments, the server can obtain just certain types of configuration information of the terminal according to actual needs.

The configuration information can be the factory configuration information of a terminal. However, the configuration information of the terminal can change dynamically. For example, the configuration information after some changes may not be identical with the factory configuration information. As such, to improve the downloading efficiency of the update file, when obtaining the configuration information of each terminal, the server can obtain the latest configuration information of the terminal according to some embodiments disclosed herein.

S202. The server determines the device group each terminal belongs to, and the classification of master and slave devices in each device group according to the device grouping strategy, the classification strategy of master and slave device, and the configuration information of each terminal.

Specifically, when the server is grouping the devices, it can determine the device group each terminal belongs to based on the device grouping strategy. The server can also determine the device group each terminal belong to based on the device grouping strategy and the configuration information of each terminal.

When determining the device group each terminal belongs to based on the device grouping strategy and the configuration information of each terminal. Specifically, the server can select several types of configuration information. Among the terminals, the server can determine that the terminals having identical all types of configuration information are the same group according to some embodiments. In some other embodiments, the server can determine that if at least several types of configuration information are the same, the terminals can be grouped into a same group.

In the case that each type of configuration information is the same for the devices within the same group, for example, the server can select two types of configuration information, including the device manufacturer and the hardware version. If all the devices are labeled as device 1 through device 10, then among the 10 devices, the devices with the same content (i.e., value) for device manufacturer (parameter) can be classified into a first group, and the devices with the same content of hardware version can be classified into a second group. In each group, the devices with both the same device manufacturer and the same hardware version can be classified into a same group.

When the server determines the master and slave devices in a group of devices, it can determine the classification of master and slave device in each device group based on the classification strategy of master and slave devices, it can also determine the classification of master and slave device in each device group based on the classification strategy of master and slave devices, and the configuration information of each terminal.

The classification strategy of master and slave devices can be, for example, randomly selecting a terminal with server capabilities as the master device, and other terminals as slave devices.

To improve the downloading efficiency of update files, the classification strategy of master and slave devices can be, for example, selecting the terminal with the best performance and server capabilities as the master device, and other terminals as slave devices. According to some embodiments, the terminal with the best performance can be a terminal with good network conditions, CPU performance, bandwidth, or fast response speed, etc.

When the server determines the grouping of the devices and the master and slave devices, it can determine the grouping of the devices first, and then determine master and slave devices according to some embodiments.

In some other embodiments, the server can also determine the master and slave devices first, and then determine the grouping of the devices. For example, the server can determine the master and slave devices based on the classification strategy of master and slave devices and the configuration information of each terminal. The server can then select at least one master device from the master devices determined based on the device grouping strategy as the master device of a certain device group A, and selecting at least two slave devices from the slave devices determined as the slave devices of the device group A.

S203. The server sends the information of the master devices in each device group to the slave devices of this device group. The information of the master devices is employed for the slave devices in each device group to download the update files.

In the update file download method according to some embodiments of the present disclosure, by setting the terminal device groups, and the master and slave devices, the server only need to send update requests and update files to the master devices in each device group, and the slave devices can obtain update files from the master devices. Therefore, a large number of slave devices do not have to obtain update files from the server, thereby the server load is significantly reduced, and the download efficiency for the update files is improved.

In the update file download method according to some embodiments of the present disclosure, after step S202, the method further comprises: the server sends information employed for the master devices to download update files to the master devices in each device group.

In some embodiments, the information employed for the master devices to download update files comprises a server address. In some embodiments, the information employed for the master devices to download update files comprises information used for determining the address of the server, such as a server identifier, and a server ID number, etc.

In the aforementioned step S203, the information of the master devices employed for the slave devices to download the update files can include the addresses of the master devices. In some embodiments, the information of the master devices employed for the slave devices to download the update files can include the information used for determining the addresses of the master devices.

In some embodiments, to further improve the download efficiency, the information used for the master devices to download the update files comprises the server address, or the information used for determining the server address.

The information used for the master devices to download the update files can further comprise the information used for indicating the status of the server, the size of the data to be downloaded, the estimated download time, the download requests, the set parameter value requests etc.

For example, the information employed for indicating the status of the server can be the information indicating that the server can send update files to the master devices at the present time, or that the server cannot send update files to the master devices at the present time.

In the aforementioned step S203, the information of the master devices used for the slave devices to download the update files can further include the information used for indicating the status of the master devices, the size of the data to be downloaded, the estimated download time, the download requests, and the set parameter values requests, etc.

In some embodiments, the information used for indicating the status of the master devices can be the information indicating that the master devices can send the update files to the slave devices at the present time, or that the master devices cannot send the update files to the slave devices at the present time.

In some embodiments, after step S202, the server's address is preset in the master devices in each device group, and the master devices download update files from the server of which address is preset.

In some embodiments, after step S202, the method further comprises: the server sends the information used for the master devices to download update files to the master devices in each device group. In an example, if the information employed for the master devices to download update files is the server address, and the server's address is preset in the master devices in each device group, if the received server's address is not the same as the preset server's address, then the master devices will download update files from the received server's address; if the server's address is not preset in the master devices in each device group, the master devices will download the update files from the received server's address.

In some embodiments, when the server obtains the configuration information in step S201, if the terminal actively sends the configuration information to the server, it can be included in the inform requests, or other requests sent to the server.

In some embodiments, the server determines the device group each terminal belongs to and the classification of master and slave device in each device group based on the device grouping strategy, the classification strategy of master and slave device and the configuration information of each terminal in step S202. In an example, the basis for determining can be the device grouping strategy and the classification strategy of master and slave devices predetermined prior to obtaining the configuration information of each terminal. In another example, the device grouping strategy and the classification strategy of master and slave devices can be determined by the sever based on the configuration information obtained.

For example, if the configuration information of the terminals obtained by the server is only hardware version and software version, and the information about the device manufacturer is not obtained, then the device grouping strategy the server determines based on the configuration information obtained includes: dividing the devices with the same hardware version and software version into the same device group, and the determined device grouping strategy does not include the information about the device manufacturer.

In another example, the device grouping strategy predetermined prior to the server obtaining the configuration information of each terminal includes: classifying the devices with the same device manufacturer, hardware version and software version into the same group, and if the terminal configuration information obtained by the server includes only the hardware versions and software versions, and the device manufacturer information is not included, the server can determine the device grouping strategy as classifying the devices with the same hardware version and software version into the same group according to the configuration information obtained.

Through the aforementioned method in which the server determines the device grouping strategy and the classification strategy of the master and slave devices based on the configuration information obtained, the problem that the predetermined device grouping strategy and classification strategy of master and slave devices can become no longer applicable due to changes of the configuration information obtained is solved, and the flexibility of the device grouping, and classification of master and slave devices can be improved.

In some embodiments, in step S202, after the server determines the device group each terminal belongs to and the classification of master and slave devices, the method further comprises: sending to each master device in each device group the information that the terminal set as a master device, such that the terminal can ensure that the terminal itself opens a file server after downloading the update files, to thereby facilitate the downloading of update files by the slave devices in the same device group.

Specifically, when the server sends an "inform" response corresponding to an "inform" request to each master device determined in each device group, the information used for informing the terminal that it is employed as a master device is also included in the inform response.

Specifically, when the server sends the address information of the master device in each device group to each determined slave device in this device group, e.g., included in the download request, so that the update files can be downloaded based on the terminal address after each slave device receives the download request sent by the server. Or, the server can send parameter setting requests carrying terminal address information separately to each slave device determined in each device group.

In order to further improve the downloading efficiency of update files, in aforementioned step S202, the determination by the server of the device group each terminal belongs to and the classification of master and slave devices in each device group based on the device grouping strategy, the classification strategy of master and slave devices and the configuration information of each terminal can be implemented through the following approaches.

The device grouping strategy of the server can include, for example: dividing terminals with the same device manufacturer, hardware version and software version into the same group. As the configuration information is fixed, the efficiency of obtaining configuration information is higher compared with obtaining dynamic configuration information.

The classification strategy of master and slave devices of the server can include, for example: classifying the device group according to the dynamic configuration information. Specifically, selecting the device with file server capability and low average CPU usage rate as the master device, while classifying other devices as slave devices. In this case, the terminal configuration information obtained by the server will change along with the application of the terminals. Therefore, in general the server can divide the devices into groups and select the master and slave devices according to the current terminal configuration information sent by the terminals.

In the following, specific embodiments will be provided to illustrate the device grouping strategies and the master and slave device classification strategies of the server.

In an embodiment, the grouping strategy as shown in Table 1 is set based on factors such as the device manufacturer, the hardware version, the software version, and the location information.

TABLE 1

|  | Device manufacturer | Hardware version | Software version | Location information |
|---|---|---|---|---|
| Grouping strategy 1 | ✓ | ✓ | ✓ | ✓ |
| Grouping strategy 2 | ✓ | ✓ | ✓ |  |
| Grouping strategy 3 | ✓ | ✓ |  | ✓ |
| Grouping strategy 4 | ✓ | ✓ |  |  |

For example, the server assigns a terminal into device group 1 after determining that the terminal conforms to grouping strategy 1 based on the configuration information provided by the terminal.

In specific implementations, when determining the device group to which a terminal belongs based on the device grouping strategies set by the server, a terminal can be assigned into several different device groups if it conforms to several grouping strategies at the same time.

In some embodiments, grouping strategies can also be set to assign a terminal into only one device group.

In an example, if the terminal configuration information obtained by the server includes the device manufacturer, the hardware version, the software version, and the file server, etc., then the device grouping strategy set in the server can be: assigning the devices with the same device manufacturer, hardware version, software version, and in the first geographical location (e.g., zone A) into device group A (i.e., setting one device group that is group A), and assigning the devices in zone B into device group B.

The classification strategy of master and slave devices can be: randomly selecting a device with file server capability as the master device, while having other devices as slave devices. If a terminal is both in zone A and zone B, when the terminal joins the device group A and group B simultaneously, if the terminal is employed as slave device in both device group A and device group B, then the server can choose to inform the terminal of the address information of the master device in device group A and/or B. If the terminal receives the address information of the master device in device group A and device group B, the terminal can select the master device with a faster response speed for update file download based on certain strategies (such as sending test reports to these two master devices).

In some embodiments, the terminal can select one master device randomly, or select one master device in accordance with the server's sending sequence to download the update files.

Specifically, the server can determine the classification of master or slave device of each terminal based on the classification strategy of master and slave devices and the configuration information of each terminal, for example, by determining the classification of master or slave device of each terminal based on the preset classification strategy of master and slave devices and the configuration information of each terminal including any one of or a combination of the device manufacturer, the hardware version, the software version, the location information, the average CPU usage rate, the cache size, the network bandwidth, and the file server.

For example: the master and slave device classification strategy as shown in Table 2 is set by the server based on factors such as the average CPU usage rate, the cache size, the network bandwidth, and the file server.

TABLE 2

|  | Average CPU usage rate | Cache size | Network bandwidth | File server |
|---|---|---|---|---|
| Classification strategy 1 of master and slave devices | ✓ | ✓ | ✓ | ✓ |
| Classification strategy 2 of master and slave devices | ✓ | ✓ |  | ✓ |
| Classification strategy 3 of master and slave devices | ✓ |  | ✓ | ✓ |

TABLE 2-continued

| | Average CPU usage rate | Cache size | Network bandwidth | File server |
|---|---|---|---|---|
| Classification strategy 4 of master and slave devices | | ✓ | ✓ | ✓ |

The server determines to have a terminal as a master device in device group 1 after determining that the terminal conforms to the strategy for master device in device group 1. In specific implementations, a terminal can be included in multiple device groups as a master device when the same terminal conforms to the classification strategies for master devices of multiple device groups, based on the device grouping strategy and the classification strategy for master and slave devices set by the server.

In some embodiments, device grouping strategy and classification strategy for master and slaves can also be set such that the same terminal can only be added to one device group as the master device.

If the same terminal is the master device of multiple device groups, after receiving the update requests from the slave devices in multiple device groups, the update files can be sent to each slave device in the order of receiving the update requests. In some embodiments, the order of sending update files to each slave device can also be based on parameters such as the quality of network signals.

In specific implementations of the update file download method provided by some embodiments of the present disclosure, in step S203, after sending download requests to each master device, the server will receive update requests sent by the master devices, then the server will send update files to the master devices, and receive download responses from the master devices after the update files are downloaded.

In addition, in the update file download method provided by embodiments of the present disclosure, after step S204, the server will also receive download responses from the slave devices after the salve devices download the update files from the master devices.

Figure 3:
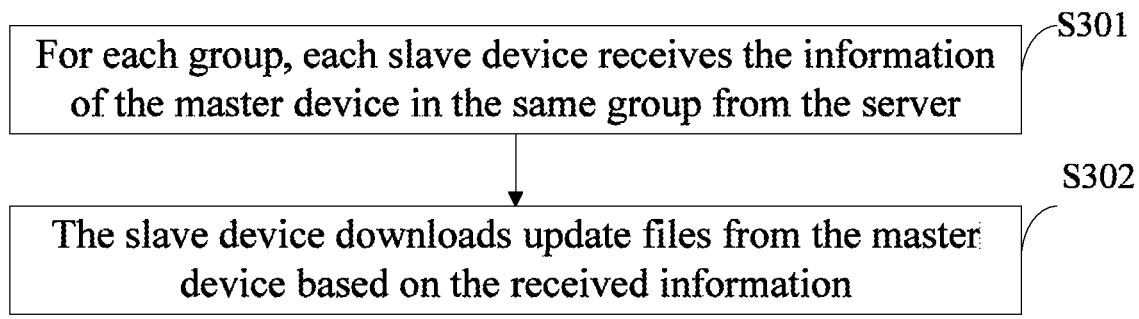
FIG. 3 is a flow chart illustrating the update file download method provided by embodiments of the present disclosure at a slave device side.

In some embodiments, an update file download method at the side of the slave devices in each device group is provided. As illustrated in FIG. 3, an example method can include the following steps.

Step S301, the slave devices in each device group receive from the server the information of the master devices in the device group to which the slave devices belong.

The information of the master devices can include the addresses of the master device; it can also be the information for determining the addresses of the master devices. In the following, detailed description will be provided with an example where the information comprises the address information of the master devices.

The addresses of the master devices received can be a single address, or multiple addresses.

Specifically, if a slave device only belongs to one device group, the address of the master device received can be a single address, and the master device is the master device of the device group to which the slave device belongs; or, the addresses of the master devices can be multiple addresses and there are multiple master devices in the device group to which the slave device belongs; if the slave device belongs to multiple device groups at the same time, the addresses of the master devices received are multiple, and the multiple addresses received can be the addresses corresponding to the master devices of multiple device groups one to one. In some embodiments, the multiple addresses can be the addresses of some of the master devices of the multiple device groups.

When multiple addresses of master devices are received by the slave devices in each device group, one address can be randomly selected from the multiple addresses, and update files can be downloaded from the terminal corresponding to the address selected.

Step S302, the slave devices in each device group download the update files from the master devices based on the information of the master devices received.

In the case that the information of the master devices includes the addresses of the master devices as an example, downloading the update files from the master device based on the address received comprises: the slave devices in the device group send update requests to the master device in the same device group to which the slave devices belong, and receive the update files from the master device in the same device group.

In the update file download method provided by some embodiments of the present disclosure, the slave devices in each device group obtain update files from the master device in the same device group. As such, a large number of slave devices do not need to send update requests to the server, and the server does not need to send update files to a large number of slave devices. Therefore, the server load for processing update requests is thereby significantly reduced, and the update file download efficiency is improved.

In specific implementations, in the update file download method provided by some embodiments of the present disclosure, prior to step S301, the method further comprises: the slave devices in each device group send the server the configuration information of these slave devices. The configuration information includes one or more of the information of the device manufacturers, the hardware versions, the software versions, the location information, the average CPU usage rates, the cache sizes, the network bandwidths, and the file servers, so that the server can determine the device group each terminal belongs to and the classification of master and slave devices in each device group based on the device grouping strategy, the classification strategy of master and slave devices in each device group, the configuration information of each terminal, and further the slave devices in each device group can download the update files from the server based on the address of the master device in the same device group to which the slave devices belong.

In order to further improve the download efficiency in the case that a slave device belongs to multiple device groups at the same time, in the update file download method provided by some embodiments of the present disclosure, if the addresses of the master devices received from the server are multiple addresses in the aforementioned Step 301, in Step S302, the downloading of update files from the master devices based on the received addresses specifically comprises: determining the response speed of each master device (for example, determining the response speed of the master device through sending test reports to the master device), and downloading the update files from the master device that has the fastest response speed; or determining the terminal that receives the address sent by the sever first, and downloading files from this terminal.

To further improve the download efficiency of the update files, in the batch update file download method provided by some embodiments of the present disclosure, in the aforementioned Step S301, the information of the master devices can be information comprising address information of the master devices or the information employed for determining the addresses of the master devices. The information can also be information employed for indicating the status of the master devices, the size of the data to be downloaded, the estimated download time, the download request, the request for setting parameter values; wherein, the information employed for indicating the status of the master devices can be the information indicating that the master devices can send update files to the slave devices at the present time, or that the master devices cannot send update files to the slave devices at the present time.

Specifically, in the batch update file download method provided by some embodiments of the present disclosure, in Step S301, the terminal address information received can be carried in the download requests sent by the server, or can be carried in the set parameter value requests sent separately by the server.

Specifically, in the update file download method provided by some embodiments of the present disclosure, in Step S302, based on the addresses received, after the update file download from the master devices is completed, in general, update responses will be received from the master devices to indicate that the transmission of update files is completed. Then, the slave devices can send back download responses to the server after the download is completed.

Figure 4:
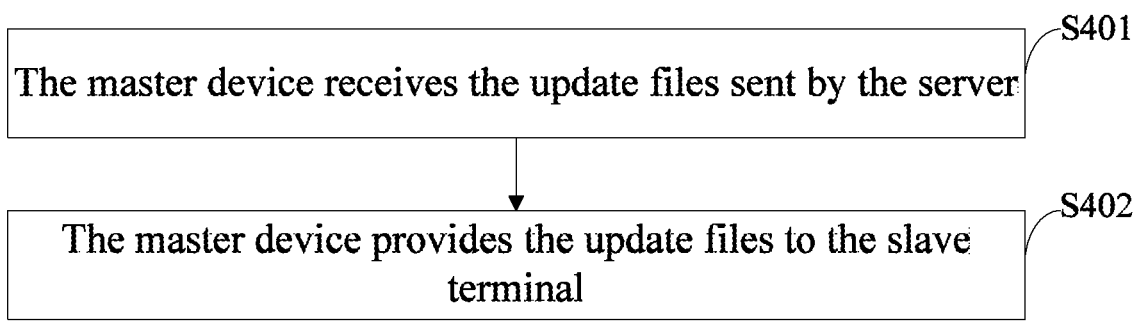
FIG. 4 is a flow chart illustrating the update file download method provided by embodiments of the present disclosure at a master device side.

In some embodiments, the batch file update method at the side of the master device is provided and illustrated in FIG. 4. The method can comprise the following steps.

Step S401, the master device in each device group receives the update files sent by the server.

In some embodiments, Step S401 comprises the master device in the device group receiving the download requests including the server address after setting the terminal as the master device in the device group based on the terminal configuration information; and downloading the update files according to the server address.

Step S402, the master device in the device group provides the update files to the each of the slave devices in the device group to which the master device belongs.

In some embodiments, Step S402 comprises the master device in the device group sends update files to the slave devices in the device group after the master device receives the update requests sent by the slave devices.

In the update file download method provided by some embodiments of the present disclosure, a large number of slave devices do not need to send update requests to the server, and the server load is significantly reduced.

In some embodiments, prior to executing Step S401, the method can further comprise: the master device in each device group sending the configuration information of the master device to the server. The configuration information can comprise one or more of: the device manufacturer, the hardware version, the software version, the location information, the average CPU usage rate, the cache size, the network bandwidth, or the file server. As such, the server can determine the device group each terminal belongs to, and the classification of master and slave devices based on the device grouping strategy, the classification strategy of master and slave devices in each device group, and the configuration information of each terminal. Therefore, the master device determined by the server can download update files from the server.

In some embodiments, the configuration information generally can be carried in the inform requests. In some other embodiments, the configuration information can be carried in other requests, or other communications.

In some embodiments, the method further comprises the master device in each device group determining the starting of its file server. There are no limitations on the order of determining the file server and the execution of Step S401 and Step S402. For example, this determining step can be executed after the master device downloading the update files from the server. In some other embodiments, this determining step can be executed after the master device receiving the update requests from the slave devices.

According to some embodiments, in Step S401, prior to the master device in the device group sending the download requests including the sever address, in general, the master device can receive the inform responses fed back by the server based on the inform requests, and information about master device can generally be included in the inform responses, so that the master device can determine whether its file server should be started after the update files are downloaded, to thereby facilitate the slave devices in the same device group downloading the update files.

In the batch update file download method according to some embodiments, after the download of update files based on the server address is completed in Step S401, the terminals generally will also send download responses to the server, to inform the server that the download of the update files is completed.

In some embodiments, after the transmission of update files to the slave devices in the device group is completed in Step S402, the master device generally will send update responses to the slave devices, to inform the slave devices that the transmission of update files is completed, so that the slave devices can feed back download responses to the server after the download is completed.

Specifically, the master device can send the update files to the slave devices through the master device's file server function. In some other embodiments, the master device can send the update files through other approaches.

Along with the development of Internet of Things, more and more Customer Premise Equipment (CPE) are needed in homes and offices. Such equipment may include, for example, a large number of home gateways, set-top boxes, telephones, routers, switches, home networking adapters, etc.

An industry consortium, the Broadband Forum (BBF) developed a protocol, Technical Report 069 (TR-069), for remote management of end-user devices. TR069 is also adopted by the oneM2M standard organization and included as an equipment management protocol of oneM2M TS0006 Management Enablement. TR-069 includes a client-server architecture, including the CPE and an Automatic configuration server (ACS).

In existing CPE management protocols, file updates are managed through the ACS, and the CPE do not have management functions. This can cause problems such as overly heavy server load and network jamming when the ACS manages the file updates of the CPE along with the increase the CPE.

Therefore, in the update file download method at the side of the server, at the side of the slave devices, and at the side of the master devices provided by some embodiments of the present disclosure, the server can be an ACS, and the terminals can be the CPE.

In the following, three embodiments are described to illustrate the update file download methods, where an ACS is employed as an example of a server, and CPE are employed as examples of terminals.

Embodiment 1

Figure 5:
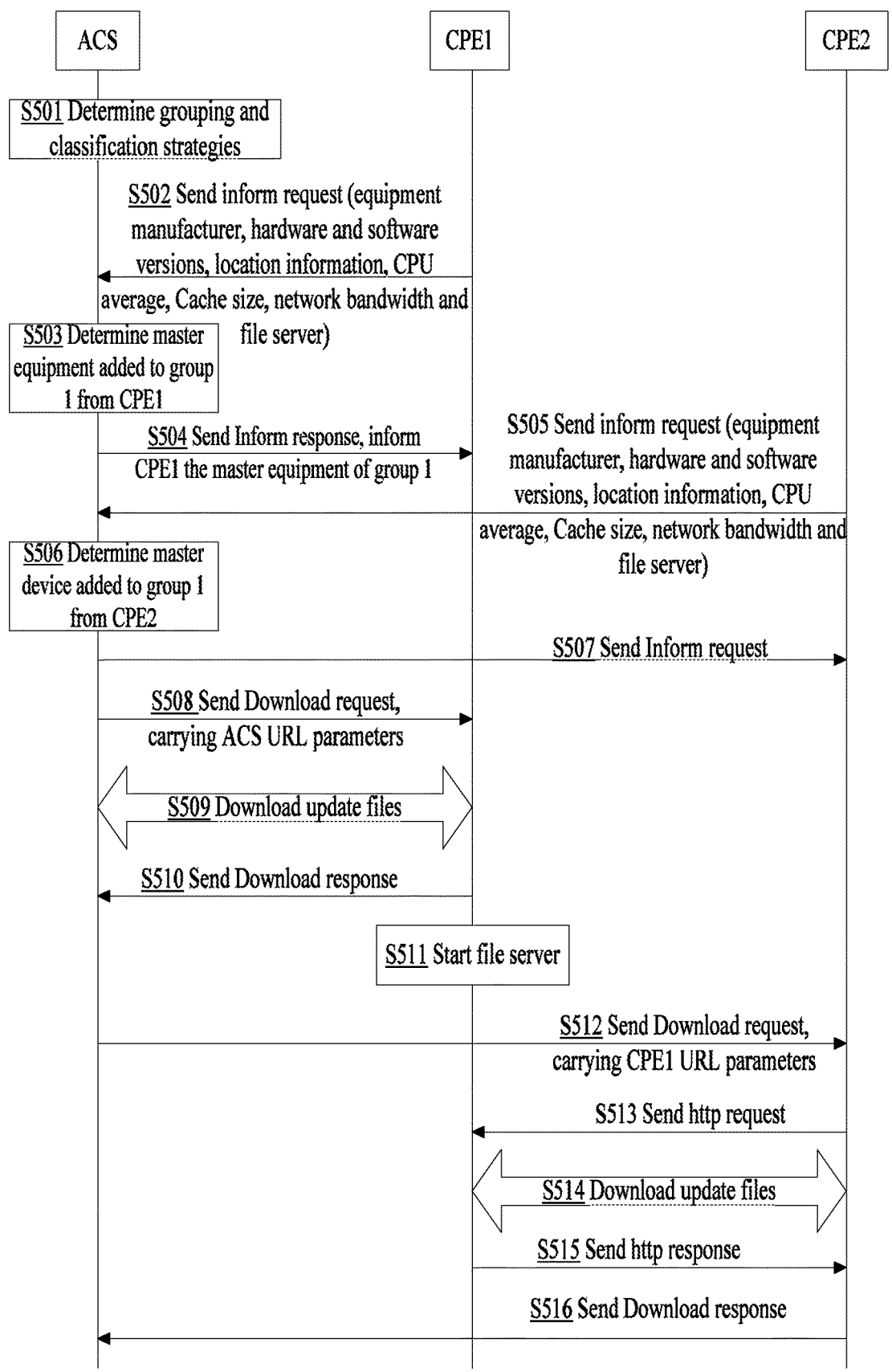
FIG. 5 is a diagram of signaling interactions provided by embodiment 1 of the present disclosure.

The signaling interaction process of this embodiment is illustrated in FIG. 5. In this embodiment, the download requests sent to the slave devices by the ACS carry the address information of the master devices, and the process can comprise the following steps.

Step S501: the ACS sets the device grouping strategy and the classification strategy of master and slave devices.

Step S502: CPE1 sends an inform request (Inform) to the ACS, in which parameters such as the device manufacturer, the hardware version, the software version, the location information, the average CPU usage rate, the cache size, the network bandwidth, and the file server are included.

Step S503: the ACS adds CPE1 to device group 1 after determining that it complies with device grouping strategy 1, and adds CPE1 as a master device in device group 1 after determining that it complies with the master device strategy.

Step S504: the ACS sends an inform response to CPE1, to inform CPE1 that it is a master device in device group 1.

Step S505: CPE2 sends an inform request to ACS, in which parameters such as the device manufacturer, the hardware version, the software version, the location information, the average CPU usage rate, the cache size, the network bandwidth, and the file server are included.

Step S506: the ACS adds CPE2 to device group 1 after determining that it complies with device grouping strategy 1, and adds CPE 2 to device group 1 as a slave device after determining that it complies with the slave device strategy.

Step S507: the ACS sends an inform response to the CPE2;

Step S508: the ACS sends a download request to the CPE1, in which the URL parameter of the ACS is included.

Step S509: the CPE1 downloads an update file via the ACS URL.

Step S510: the CPE1 sends a download response to the ACS after the update file is downloaded.

Step S511: the CPE1 starts its file server.

Step S512: the ACS sends a download request to the CPE2, in which the URL parameter of the master device CPE1 is included.

Step S513: the CPE2 sends an http request to the URL of the CPE1.

Step S514: the CPE2 downloads the update file via the URL of the CPE1.

Step S515: the CPE1 sends an http response to the CPE2 after the update file is sent.

Step S516: the CPE2 sends a download response to the ACS.

Through steps S501 to S516 described above, file updates for the CPE1 and the CPE2 can be completed.

Embodiment 2

Figure 6:
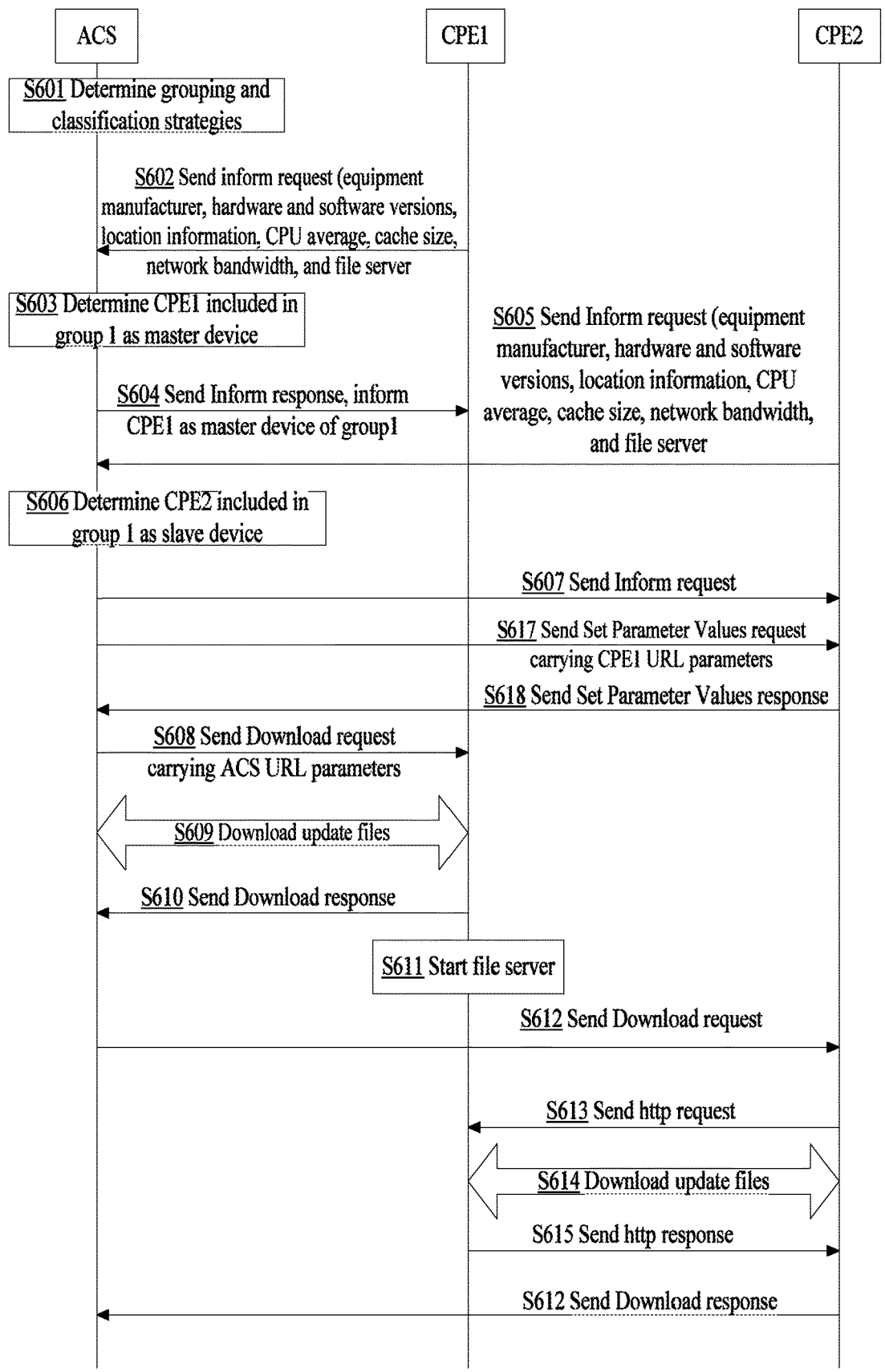
FIG. 6 is a diagram of signaling interactions provided by embodiment 2 of the present disclosure.

The signaling interaction process of this embodiment is illustrated in FIG. 6. In this embodiment, the set parameter values requests sent to the slave devices by the ACS carry the address information of the master device, and the process can comprise the following steps.

Steps S601-S611 in Embodiment 2 can be the same as Steps S501-S511 in Embodiment 1, and steps S613-S616 in Embodiment 2 can be the same as Steps S513-S516 in Embodiment 1. Therefore, these steps are not described in detail.

The method of Embodiment 2 can further include Step S612, in which the ACS sends a download request to the CPE2. In the download request, the URL parameter is null.

After executing Step S606, and prior to executing Step S612, a Step S617 can be included, in which the ACS sends a set parameter values request (Set Parameter Values) to the CPE2, and the URL parameter of master device CPE1 is included in the set parameter values request.

A Step S618 can also be included, where after the CPE2 receives the set parameter values request, the CPE2 feeds back a set parameter values response to the ACS.

Through steps S601 to S618 described above, file updates for the CPE1 and CPE2 can be completed.

Embodiment 3

Figure 7:
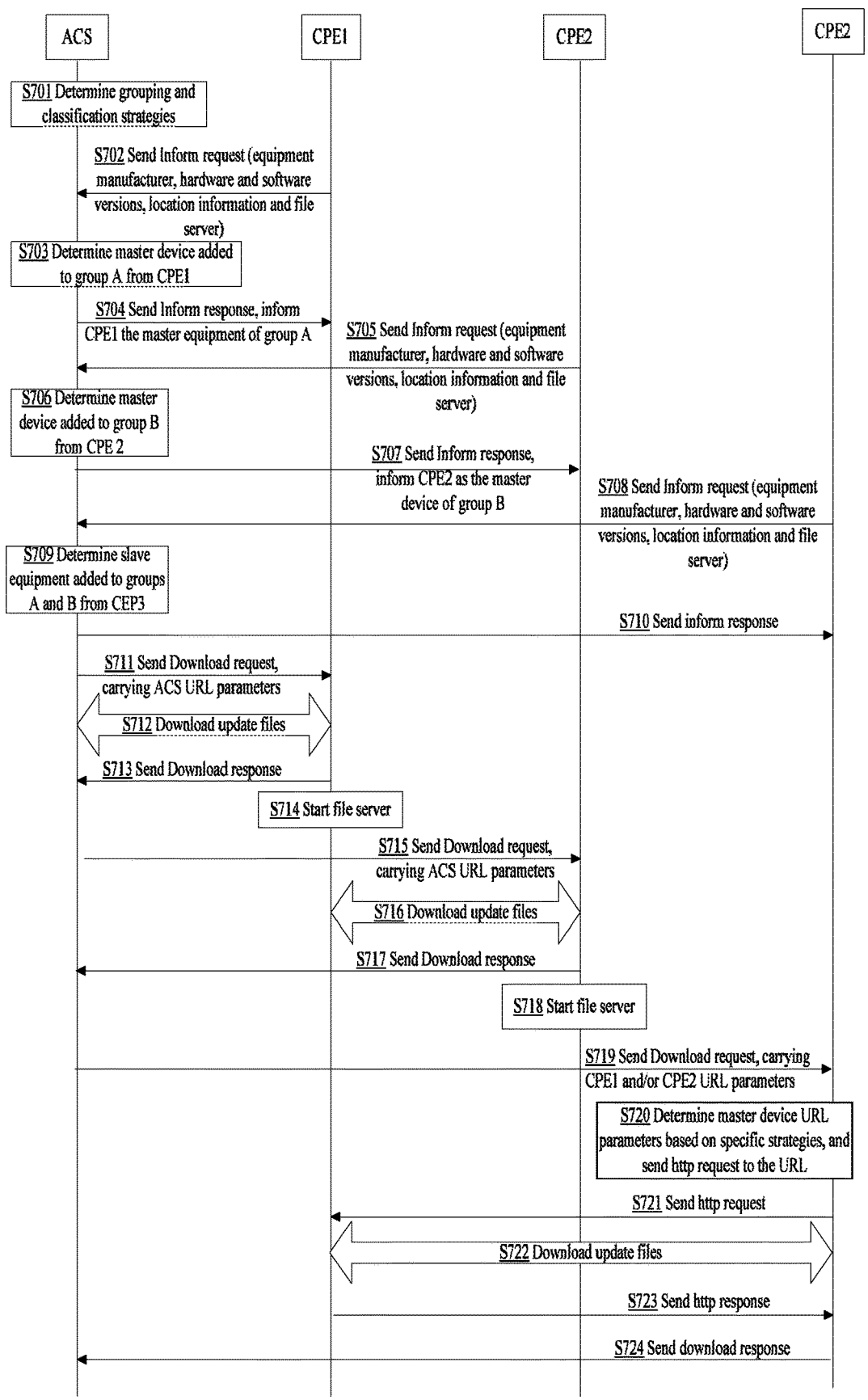
FIG. 7 is a diagram of signaling interactions provided by embodiment 3 of the present disclosure.

The signaling interaction process of this embodiment is illustrated in FIG. 7. In this embodiment, the download requests sent to the slave devices by the ACS carry the address information of the master device, and the process can include the following steps.

Step S701: the ACS sets the device grouping strategy and the classification strategy of master and slave devices. In some embodiments, the device grouping strategy can include: grouping the devices in zone A with the same device manufacturer, hardware version, and software version into device group A, grouping the devices in zone B into device group B. Group A and group B can intersect each other. The determined classification strategy of master and slave devices can include: choosing a device with a file server capability as the master device, and other devices as the slave devices.

Step S702: the CPE1 sends an inform request to the ACS, in which parameters such as the device manufacturer, the hardware version, the software version, the location information, and the file server are included.

Step S703: the ACS adds the CPE1 to device group A after determining that it complies with the device grouping strategy, and adds the CPE1 as a master device in device group A after determining that it complies with the master device strategy.

Step S704: the ACS sends an inform response to the CPE1, to inform the CPE1 that it is a master device in device group A.

Step S705: the CPE2 sends an inform request to the ACS, in which parameters such as the device manufacturer, the hardware version, the software version, the location information, and the file server are included.

Step S706: the ACS adds the CPE2 to device group B after determining that it complies with the device group strategy, and adds CPE2 as a master device in device group B after determining that it complies with the master device strategy.

Step S707: the ACS sends an inform response to the CPE2, to inform CPE2 that it is a master device in device group B;

Step S708: a CPE3 sends an inform request to the ACS, in which parameters such as the device manufacturer, the hardware version, the software version, the location information, and the file server are included.

Step S709: the ACS adds the CPE3 to device group A and device group B after determining that it complies with device grouping strategies, and adds that CPE3 as a slave device to device group A and device group B after determining that it complies with the slave device strategy.

Step S710: the ACS sends an inform response to the CPE3.

Step S711: the ACS sends a download request to the CPE1, in which the URL parameter of the ACS is included.

Step S712: the CPE1 downloads an update file via the ACS URL.

Step S713: the CPE1 sends a download response to the ACS after the update files are downloaded.

Step S714: the CPE1 starts its file server.

Step S715: the ACS sends a download request to the CPE2, in which the URL parameter of the ACS is included.

Step S716: the CPE2 downloads the update files via the ACS URL.

Step S717: the CPE2 sends a download response to the ACS after the update files are downloaded;

Step S718: the CPE2 starts its file server.

Step S719: the ACS sends a download request to the CPE3, in which the URL parameter(s) of the master device (s) CPE1 and/or CPE2 are included.

In some embodiments, in Step S719, the ACS sends a download request to the CPE3, in which the URL parameter(s) of the master device(s) CPE1 and/or CPE2 are included, including:

Step S7191: the download request carries the URL parameters of the master devices CPE1 and CPE2; or Step S7192: the download request carries the URL parameter of the master device CPE1; or Step S7193: the download request carries the URL parameter of the master device CPE2.

The method can further comprise a Step S720: CPE3 determines the URL parameter of the master device according to certain strategies, and sends an http request to the URL of the master device.

In some embodiments, in Step S720, the CPE3 determines the URL parameter of the master device according to certain strategies, and sends an http request to the URL of the master device. Step S720 can further comprise:

Step S7201: after receiving the URL parameters of CPE1 and CPE2, CPE3 will send test reports to CPE1 and CPE2, respectively, and select CPE1, which responds faster, as the master device, and send an http request to the URL of the master device, or Select the URL from the URL parameters of CPE1 or CPE2 that is first received as the URL of the master device, and send an http request, or Randomly select one URL from the URL parameters of CPE1 or CPE2 as the URL of the master device and send an http request; or Step S7202: if the URL parameter received by CPE3 is only the URL parameter of CPE1, CPE3 will send an http request to the URL of CPE1; or Step S7203: if the URL parameter received by CPE3 is only the URL parameter of CPE2, CPE3 will send an http request to the URL of CPE2. FIG. 7 illustrates an example in which CPE3 sends an http request to CPE1.

Step S722: CPE3 downloads the update files via the URL of the master device determined in Step S720.

Step S723: the master device determined in Step S720 sends an http response to CPE3 after the update files are sent.

Step S724: CPE3 sends a download response to ACS.

Through Steps S701 to S724 described above, file updates for CPE1, CPE2, and CPE3 can be completed.

In an aspect, a server, a terminal, and a batch update system are provided. The server, terminal, and system can employ the update file download methods described above.

Figure 8:
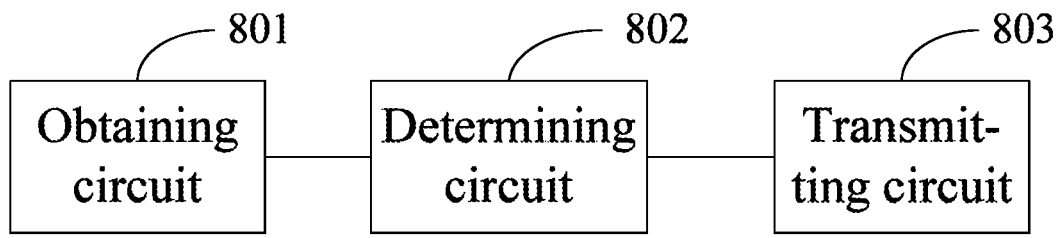
FIG. 8 is a structural diagram of a server provided by some embodiments of the present disclosure.

In some embodiments, a server is provided, as illustrated in FIG. 8, including the following portions.

An obtaining circuit 801 can be included and configured to acquire the configuration information of each terminal.

A determining circuit 802 can be included and configured to determine the device group each terminal belongs to and the classification of master and slave devices in each device group based on the device grouping strategy, the classification strategy of master and slave devices, and the configuration information of each terminal.

A transmitting circuit 803 can be included and configured to send the address of the master device in the device group to which the slave devices belong to the slave devices in each device group. The address of the master device can be employed by the slave devices in each device group to download the update files.

After adopting the update file download methods provided by embodiments of the present disclosure, the server can manage the terminals via an Open Mobile Alliance Device Management (OMA-DM) protocol. Through grouping the terminals, the master device in each device group downloads files from the ACS, and the slave devices download files from the master device in the group. The workload of the ACS and the network load are thereby reduced, and the management efficiency can be significantly improved.

In some embodiments, the determining circuit 802 can be employed to determine the device group to which each terminal belongs based on the device grouping strategy. In some embodiments, or the determining unit 802 can determine the device group to which each terminal belongs based on the device grouping strategy and the configuration information of each terminal.

In some embodiments, the determining circuit 802 can determine the classification of master and slave devices in each device group based on the classification strategy of master and slave devices.

In some embodiments, the determining circuit 802 can determine the classification of master and slave devices based on the classification strategy of master and slave devices and the configuration information of each terminal.

Specifically, in the server provided by some embodiments of the present disclosure, the determining circuit 802 can be employed to determine the device group to which each terminal belongs based on one or more of: the device grouping strategy, the terminal manufacturer, the hardware version, the software version, or the location information.

In some embodiments, the determining circuit 802 can be employed to determine the classification of master and slave devices based on one or more of: the classification strategy of master and slave devices, the device manufacturer, the hardware version, the software version, the location information, the average CPU usage rate, the cache size, the network bandwidth, or the file server.

In some embodiments, the determining circuit 802 can be employed to determine the device group to which each terminal belongs based on one or more of: the device grouping strategy, the terminal manufacturer, the hardware version, the software version, or the location information. The determining circuit 802 can also to determine the classification strategy of master and slave devices in each device group based on one or more of: the classification strategy of master and slave device, the device manufacturer, the cache size, the network bandwidth, or the file server.

In some embodiments, the transmitting circuit 803 can be configured to send information to the master device in each device group used for the master device to download the update files.

In some embodiments, the transmitting circuit 803 can be configured to send information including server's address to the master device in each device group, and send information including the address of the master device in the device group, to which the slave devices belong, to the slave devices in each device group.

In some embodiments, the transmitting circuit 803 can be configured to send download requests that carry the address of the master device to the slave devices in each device group, or send set parameter values requests that carry the address of the master device to the slave devices in each device group.

In some embodiments, the determining circuit 802 can be configured to determine the device group to which each terminal belongs, and the classification of master and slave devices, based on the preset strategies prior to obtaining the configuration information of each terminal, or based on the strategy generated according to the configuration information obtained.

In some embodiments, the obtaining circuit 801 can be configured to obtain the configuration information from each terminal, from each terminal from the server locally, or from a third party server.

In some embodiments, the server can be an ACS, or other types of servers. ACS can be employed for Digital Subscriber's Line (DSL) access networks. In a DSL access network, because a lot of CPE are distributed sparsely and generally are at the customer side, management and maintenance of the equipment can be difficult. As such, ACS is usually adopted for remote and centralized management of the CPE.

After adopting the update file download methods provided by some embodiments of the present disclosure, the ACS can manage many pieces CPE via CPE Wide Area Network (WAN) Management Protocol (CWMP), a management protocol at the CPE WAN side. By dividing the CPE into groups, the master device in each device group can download files from the ACS, and the slave devices in the device group can download the files from the master device. The workload of the ACS and the network load are thereby reduced, and the management efficiency can be significantly improved.

Figure 9:
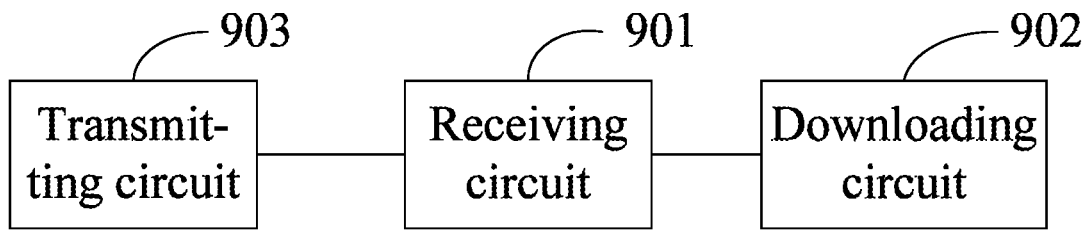
FIG. 9 is a structural diagram of a terminal provided by some embodiments of the present disclosure.

In some embodiments, a terminal is provided and is illustrated in FIG. 9. The terminal can include the following portions.

A receiving circuit 901 can be included and configured to receive the information of the master device in the device group to which the terminal belongs, wherein the information of the master can be sent by the server.

A downloading circuit 902 can be included and configured to download update files from the master device based on the received information of the master device.

In some embodiments, the terminal can further comprise a second transmitting circuit 903 configured to send the configuration information of the terminal to the server, prior to the master device receiving the address sent by the server, so that the server can determine the classification of master or slave device of each terminal based on the configuration information.

In some embodiments, the receiving circuit 901 can be configured to receive the address information, sent by the server, of the master device in the device group to which the terminal belongs.

In some embodiments, the receiving circuit 901 can be configured to receive the download requests or set parameter values requests sent by the server; wherein, the download requests or the set parameter values requests carry the addresses of the master device in the device group to which the terminal belongs.

In some embodiments, the downloading circuit 902 can be configured to download update files from the master device that has the fastest response speed after the response speed of each master device is determined based on the received addresses of the multiple master devices.

In some other embodiments; the downloading circuit 902 can be configured to download update files from a terminal that is determined to be the first master device that receives the address sent by the server.

In some other embodiments, the downloading circuit 902 can be configured to download update files from the master device randomly selected from the master devices.

In some other embodiments, the downloading circuit 902 is can be configured to download update files from one master device of which the address is received.

Figure 10:
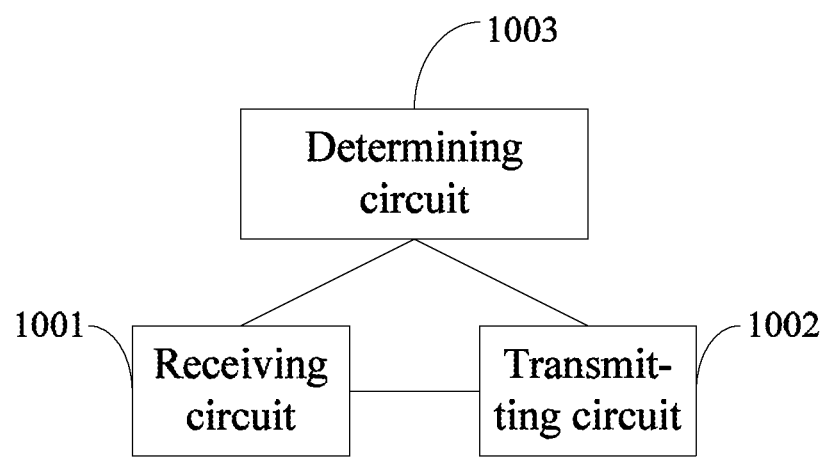
FIG. 10 is a structural diagram of another terminal provided by embodiments of the present disclosure.

In some embodiments, another terminal is provided as illustrated in FIG. 10, which can comprise the following portions.

A receiving circuit 1001 can be included and configured to receive update files sent by the server.

A third transmitting circuit 1002 can be included and configured to provide the update files to each slave device in the device group to which the master device belongs.

In some embodiments, the third transmitting circuit 1002 can be further configured to send its own configuration information to the server before the terminal receives the update files sent by the server, so that the server can determine the classification of master or slave device based on the configuration information.

In some embodiments, the terminal further comprises a second determining circuit 1003 configured to determine the starting of its own file server.

In some embodiments, the terminals illustrated in FIG. 9 and FIG. 10 can be CPE. CPE can be employed in access network environment, in DSL access network, etc. The number of CPE devices can be very large, and their distribution can be sparse and generally they are at the customer side. It is therefore not easy to manage and maintain the CPE. As such, ACS is generally adopted for remote and centralized management.

In an aspect, a batch update system is further provided, which comprises a server, a first terminal, and a second terminal provided by embodiments described above.

In some embodiments, the system can include the following portions.

A server can be included in the system and configured to obtain the configuration information of each terminal, determine the device group to which each terminal belongs, and the classification of master and slave devices in each device group based on the device grouping strategy, the classification strategy of master and slave devices, and the configuration information of each terminal. The server can be configured to also send the address of the master device in the device group to the slave devices of the same device group.

The master device in each device group can be configured to download update files from the server;

The slave devices in each device group can be configured to download update files from the master device according to the received address of the master device.

In some embodiments, after the sever obtains the configuration information of each terminal, the server determines the device group each terminal belongs to and the classification of master and slave devices based on the device grouping strategy, the classification strategy of master and slave devices, and the configuration information.

For each master device in each device group, the server sends information that carries the server address. This information can be employed by the master devices to download update files.

For each slave device in each device group, the server sends the address of the master device to the each slave device in the same device group.

The master device in each device group downloads update files based on the server address, and the slave devices in each device group download update files from the master device.

As such, the terminals are divided into multiple groups and classified as master and slave devices, and only the master device in each device group sends update requests to the server. Advantageously, the number of update requests received by the server can be significantly reduced, thereby reducing the server load; and the server only needs to send update file data to the master devices, and the network load is significantly reduced.

Through the above description of the various embodiments, those or ordinary skill in the art will appreciate that the embodiments can be implemented with hardware, or can also be implemented with software together with, e.g., a general purpose hardware platform. For example, the technical solutions of the embodiments of the present disclosure can be implemented in the form of software products that can be stored in a nonvolatile storage media (such as CD-ROM, U-disk, or a mobile hard disk). The software can include commands or instructions to make a computer (such as a PC, a server, or a network device) execute the methods provided by embodiments of the present disclosure.

Those of ordinary skill in the art will appreciate that the modules, circuits, units, portions, or components in the devices provided by various embodiments described above can be configured in the one or more devices described above. They can also be located in one or multiple devices that is (are) different from the example embodiments described above or illustrated in the accompanying drawings. For example, the modules, circuits, units, portions, or components in various embodiments described above can be integrated into one module, or divided into several sub-modules.

The numbering of the various embodiments described above are only for the purpose of illustration, and do not represent preference of embodiments.

Those of ordinary skill in the art will recognize that the functional blocks, methods, devices, and systems described in the present disclosure may be integrated or divided into different combinations of systems, devices, and functional blocks. Any suitable programming languages and programming techniques may be used to implement the routines of particular embodiments.

Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" can be employed to realize some of the functions, devices, circuits, or methods described above, and can include any suitable hardware and/or software system, mechanism or component that processes data, signals or other information. A processor may include a system with a general-purpose central processing circuit, multiple processing circuits, dedicated circuitry for achieving functionality, or other systems.

Processing need not be limited to a geographic location, or have temporal limitations. For example, a processor may perform its functions in "real-time," "offline," in a "batch mode," etc. Portions of processing may be performed at different times and at different locations, by different (or the same) processing systems. Various embodiments disclosed herein can be realized via hardware and/or software, such as a computer program stored on a memory.

The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media such as non-transient computer readable medium suitable for storing instructions for execution by the processor. The software instructions can also be contained in, and provided as, an electronic signal, for example in the form of software as a service (SaaS) delivered from a server (e.g., a distributed system and/or a cloud computing system).

All references cited in the disclosure are incorporated by reference in their entirety.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of downloading at least one update file for at least one terminal, the method comprising:
   obtaining configuration information of each terminal;
   determining:
      a device group to which each terminal belongs; and
      a classification of master or slave device for each terminal in each device group based on a device grouping strategy, a classification strategy of master and slave devices, and the configuration information; and
   sending information of a master device to a slave device in a same device group, wherein the information of the master device is used for the slave device to download the at least one update file; and
   wherein:
      the device group is determined according to at least one of: the device grouping strategy, a manufacturer of the terminal, a hardware version, a software version, or a location information; and
      the classification is determined according to at least one of: the classification strategy of master and slave devices, a manufacturer of the terminal, a hardware version, a software version, location information, an average CPU usage rate, a cache size, a network bandwidth, or a file server;
   the method further comprising:
      receiving an update request at the master device; and
      sending, in response to the receiving the update request at the master device, the at least one update file to a corresponding slave device;
   the method further comprising, prior to the sending information of a master device to a slave device in a same device group:
      sending the configuration information of each terminal to a server, so that the server is capable of determining the classification of master or slave device based on the configuration information;
wherein the method further comprises the master device downloading the update files, the master device downloading the update files comprising:
upon the master device being preset with a server address, and a received server address being different from the preset server address, the master device downloading the update files from the received server address; and
in a case that the master device is not preset with a server address, the master device also downloading the update files form the received server address.

2. The method of claim 1, further comprising:
the master device receiving the at least one update file from a server;
the master device in each device group determining starting a file server of the master device; and
the slave device downloading the at least one update file from the master device;
wherein the device grouping strategy and the classification strategy of master and slave device comprise at least one of:
a first strategy set prior to the obtaining of configuration information of each terminal; or
a second strategy determined based on the configuration information that is obtained.

3. The method of claim 1, wherein the determining comprises:
determining the device group to which each terminal belongs based on at least one of:
the device grouping strategy, or
the configuration information of each terminal; and
determining the classification of master or slave device based on at least one of:
the classification strategy of master and slave devices, or
the configuration information of each terminal.

4. The method of claim 1, further comprising:
sending the configuration information of the each terminal to the server;
determining the device group and the classification based on the configuration information of the each terminal; and
sending information about the device group and the classification for the each terminal to the each terminal.

5. The method of claim 1, wherein a terminal is classified as a master device upon determining the terminal having a file server capability and a low average CPU usage rate.

6. The method of claim 1, wherein:
in a case of one master device corresponding to multiple slave devices and the one master device receiving update requests from the multiple slave devices, the update files are sent to each of the multiple slave devices in an order of receiving the update requests or based on quality of network signals; and
in a case of one slave device corresponding to multiple master devices, the method further comprises selecting a master device among the multiple master devices by determining a response speed of each master device, and downloading the update files from the selected master device that has the fastest response speed; or by selecting terminal that receives the address sent by the server first, and downloading files from the selected terminal.

7. The method of claim 1, further comprising, after the determining the device group and the determining the classification of master or slave device:
sending information for the master device to download the at least one update file to the master device in each device group.

8. The method of claim 7, wherein:
the information for the master device to download the at least one update file comprises:
a server address or information for determining the server address, the information for determining the server address comprises at least one of a server identification or a server number; and
information indicating a status of the server, size of data to be downloaded, expected download time, download requests, and set parameter values requests.

9. The method of claim 8, wherein the sending information of a master device to a slave device in a same device group comprises at least one of:
sending download requests that carry the master device address to the slave device, or sending set parameter values requests that carry the master device address to the slave device.

10. The method of claim 1, wherein:
the information of the master device comprises an address of the master device; and
the method further comprising at least one of:
receiving from the server download requests that carry the address, or
receiving from the server set parameter values requests that carry the address.

11. The method of claim 10, further comprising at least one of:
receiving an address of each of at least one master device, determining a response speed of each of the at least one master device, and downloading the at least one update file from one of the at least one master device having a fastest respond speed;
receiving an address of each of at least one master device, and downloading the at least one update file from one of the at least one master device having an address that is received earliest from the server;
receiving an address of each of at least one master device, and downloading the at least one update file from randomly selected master device; or
receiving an address of a sole master device, and downloading the at least one update file from the sole master device.

12. The method of claim 1, wherein the obtaining configuration information of each terminal comprises:
obtaining the configuration information from each terminal;
obtaining the configuration information of each terminal from the server; or
obtaining the configuration information of each terminal from a second server.

13. A server, comprising:
an obtaining circuit, configured to obtain configuration information of each of at least one terminal;
a determining circuit, configured to determine a device group to which each terminal belongs, and to determine a classification of master or slave device for each terminal in each device group based on a device grouping strategy, a classification strategy of master and slave devices, and the configuration information of each terminal; and a transmitting circuit, configured to send information of a master device in each device group to one or more slave devices of a same device group, wherein the information of the master device is used by the one or more slave devices in the same device group to download update files;

wherein:

the device group is determined according to at least one of: the device grouping strategy, a manufacturer of the terminal, a hardware version, a software version, or a location information;

the classification is determined according to at least one of: the classification strategy of master and slave devices, a manufacturer of the terminal, a hardware version, a software version, location information, an average CPU usage rate, a cache size, a network bandwidth, or a file server; and the master device is configured to receive update requests, and send, in response to the receiving the update request at the master device, the update files to a corresponding slave device;

the at least one terminal is configured to, prior to the transmitting circuit sending information of the master device in each device group to one or more slave devices of a same device group:

send the configuration information of each terminal to the server, so that the server is capable of determining the classification of master or slave device based on the configuration information;

wherein the master device is further configured to download the update files including:

upon the master device being preset with a server address, and a received server address being different from the preset server address, the master device downloading the update files from the received server address; and in a case that the master device is not preset with a server address, the master device also downloading the update files form the received server address.

14. The server of claim 13, wherein the determining circuit is further configured to realize at least one of:

determining the device group to which each terminal belongs based on the device grouping strategy;

determining the device group to which each terminal belongs based on the device grouping strategy and the configuration information of each terminal;

determining the device group to which each terminal belongs based on at least one of: the device grouping strategy, a device manufacturer, a hardware version, a software version, or location information;

determining the classification of master or slave device based on the classification strategy of master and slave devices;

determining the classification of master or slave device based on the classification strategy of master and slave devices and the configuration information of each terminal;

or determining the classification of master and slave device in each device group based on at least one of: the classification strategy of master and slave devices, a device manufacturer, a hardware version, a software version, location information, an average CPU usage rate, a cache size, a network bandwidth, or a file server.

15. The server of claim 13, wherein:

the transmitting circuit is further configured to send information for the master device to download update files to each master device in each device group the obtaining circuit is configured to:

obtain the configuration information from each terminal;

obtain the configuration information of each terminal locally from the server; or obtain the configuration information of each terminal from a second server; and the device grouping strategy and the classification strategy of master and slave device comprise at least one of:

a first strategy set prior to the obtaining of configuration information of each terminal; or a second strategy determined based on the configuration information that is obtained.

16. The server of claim 13, wherein the transmitting circuit is further configured to:

send a server address to the master device in each device group; and send an address of the master device in each device group to the one or more slave devices of the same device group; and wherein the server address or the address of the master device is carried in a download request sent from the server to the one or more slave devices, thereby facilitating the one or more slave devices downloading the update files based on the server address or the address of the master device upon the one or more slave devices receiving the download request.

17. The server of claim 16, wherein the transmitting circuit is configured to:

send download requests that carry the address of the master device in the each device group to the one or more slave devices of the same device group; or send set parameter values requests that carry the address of the master device in the each device group to the one or more slave devices of the same device group.

18. An update file download system, comprising:

at least one terminal; and a server configured to:

obtain configuration information of each terminal;

determine a device group to which each terminal belongs and a classification of master or slave device for each terminal in each device group based on a device grouping strategy, a classification strategy of master and slave devices, and the configuration information of each terminal; and send information of a master device to one or more slave devices of a same device group;

wherein:

the master device is configured to download at least one update file from the server;

the slave device in each device group is configured to download the at least one update file from the master device according to the information of the master devices received;

the slave device comprises:

a receiving circuit configured to receive the information of the master device belong sent by the server; and a downloading circuit configured to download the at least one update file from the master device based on the information of the master device;

and the master device comprises:

a receiving circuit configured to receive the at least one update file sent by the server; and a transmitting circuit configured to provide the at least one update file to one or more slave devices in the same device group; and wherein:

the device group is determined according to at least one of: the device grouping strategy, a manufacturer of the terminal, a hardware version, a software version, or a location information;

the classification is determined according to at least one of: the classification strategy of master and slave devices, a manufacturer of the terminal, a hardware version, a software version, location information, an average CPU usage rate, a cache size, a network bandwidth, or a file server; and the master device is configured to receive an update request, and send, in response to the receiving the update request at the master device, the update files to a corresponding slave device;

the at least one terminal is configured to, prior to the transmitting circuit sending information of the master device in each device group to one or more slave devices of a same device group:

send the configuration information of each terminal to the server, so that the server is capable of determining the classification of master or slave device based on the configuration information;

wherein the master device is further configured to download the update files including:

upon the master device being preset with a server address, and a received server address being different from the preset server address, the master device downloading the update files from the received server address; and in a case that the master device is not preset with a server address, the master device also downloading the update files form the received server address.

19. The system of claim 18, wherein:

the receiving circuit of the slave device is configured to realize at least one of:

receiving download requests sent by the server carrying an address of the master device in the same device group; or receiving set parameter values requests sent by the server carrying an address of the master device in the same device group;

the transmitting circuit of the master device is configured to send configuration information of the master device to the server prior to the receiving circuit receiving the at least one update file sent by the server, such that the server can determine the classification of the master device based on the configuration information;

the server is an auto-configuration server (ACS); and the at least one terminal comprises at least one customer premise equipment (CPE).

* * * * *